US012650588B2

(12) United States Patent
Lew et al.

(10) Patent No.: US 12,650,588 B2
(45) Date of Patent: Jun. 9, 2026

(54) MULTI-VIEW REFLECTOR MICROSCOPE

(71) Applicant: Washington University, St. Louis, MO (US)

(72) Inventors: Matthew Lew, St. Louis, MO (US); Oumeng Zhang, St. Louis, MO (US)

(73) Assignee: Washington University, St. Louis, MO (US)

( * ) Notice: Subject to any disclaimer, the term of this patent is extended or adjusted under 35 U.S.C. 154(b) by 364 days.

(21) Appl. No.: 18/254,448

(22) PCT Filed: Dec. 13, 2021

(86) PCT No.: PCT/US2021/063071
§ 371 (c)(1),
(2) Date: May 25, 2023

(87) PCT Pub. No.: WO2022/126011
PCT Pub. Date: Jun. 16, 2022

(65) Prior Publication Data
US 2024/0210671 A1      Jun. 27, 2024

Related U.S. Application Data

(60) Provisional application No. 63/124,522, filed on Dec. 11, 2020.

(51) Int. Cl.
| | |
|---|---|
| *G02B 21/36* | (2006.01) |
| *G02B 21/18* | (2006.01) |
| *G02B 27/14* | (2006.01) |
| *G02B 27/28* | (2006.01) |

(52) U.S. Cl.
CPC ........... *G02B 21/361* (2013.01); *G02B 21/18* (2013.01); *G02B 27/14* (2013.01); *G02B 27/283* (2013.01); *G02B 27/286* (2013.01)

(58) Field of Classification Search
CPC ...... G02B 21/361; G02B 21/18; G02B 27/14; G02B 27/283; G02B 27/286
USPC ......................................................... 359/618
See application file for complete search history.

(56) References Cited

U.S. PATENT DOCUMENTS

| | | | |
|---|---|---|---|
| 4,837,451 | A | 6/1989 | Pinson |
| 2008/0030721 | A1 | 2/2008 | Kepler et al. |
| 2018/0307132 | A1 | 10/2018 | Zhang et al. |

OTHER PUBLICATIONS

PCT International Search Report and Written Opinion for Patent Application PCT/US 2021/063071 mailed Mar. 31, 2022; 10 pp.

*Primary Examiner* — William Choi
(74) *Attorney, Agent, or Firm* — Armstrong Teasdale LLP

(57) ABSTRACT

An imaging system uses a multi-view reflector (MVR) to simultaneously measure the three-dimensional (3D) position and orientation of a light emitter. The MVR is positioned at a back focal plane (BFP) of a light collecting optical system, and uses pyramid reflectors and/or conical reflectors to reflect light in at least two regions of the BFP to at least two detection channels of a detector. The at least two detection channels produce images that are used to determine the 3D position and orientation of a light emitter. The system may be used, for example, to image the structure of molecules or organelles in a cell, track the movement of molecules in a cell, or to study the interaction of molecules within a cell.

20 Claims, 8 Drawing Sheets

A.

B.

MULTI-VIEW REFLECTOR MICROSCOPE

CROSS-REFERENCE TO RELATED APPLICATIONS

This application is a US National Stage Entry of International Patent Application No. PCT/US2021/063071, filed Dec. 13, 2021, which claims the benefit of U.S. Provisional Application No. 63/124,522, filed Dec. 11, 2020, the entire contents of which are hereby incorporated herein by reference in their entireties.

STATEMENT REGARDING FEDERALLY SPONSORED RESEARCH OR DEVELOPMENT

This invention was made with government support under 1653777 awarded by the National Science Foundation and under GM124858 awarded by the National Institutes of Health. The government has certain rights in the invention.

FIELD OF THE INVENTION

The present disclosure generally relates to devices for simultaneously and accurately imaging the 3D position and 3D orientation of dipole-like emitters, and methods of using the same.

BACKGROUND OF THE INVENTION

Understanding the machinery of living cells is a goal of a variety biological and medical research. One way to understand the complex machinery at work within living cells is to measure the movement of individual molecules. For example, single-particle tracking (SPT), in which the trajectory of a moving individual molecular label, quantum dot, or nanoparticle is determined from a series of images, provides a valuable tool for a wide range of biological applications. Information obtained from such methodology sheds light on physical properties such as molecule size, conformation, and the local environment.

While such methodology is useful for isotropic emitters, problems arise when attempting to image individual, biological molecules. This is because such molecules are not isotropic, spherical emitters, but instead behave as oscillating dipoles that yield toroidal emission patterns. When such molecules move so that they are oriented at an angle to the optical axis, their lateral position may appear to be shifted due to the asymmetric distribution of electric field energy.

Most current imaging systems can image the position or orientation of light emitters, but not both. Some systems, like the plenoptic camera, light field camera/microscope, and Shack-Hartmann sensor, use a multi-lens array to image the position and angle of light rays. Such designs are inherently resolution limited, suffer from alignment/aberration difficulties, and have poor optical efficiency for low-light imaging. For example, in existing imaging methods that use multi-spot point spread functions (PSFs), tri-spot PSFs, bisected PSFs, and double helix PSFs, the signal photons are split into multiple spots resulting in a poor effective signal-to-background (SBR). FIG. 1 shows imaging results obtained using current point spread function (PSF) engineering for single-molecule orientation localization microscopy (SMOLM). Molecular orientation is encoded in the relative brightness of the spots. Axial position is encoded in the relative position of the spots. BS=bisected PSF; TS=Tri-spot PSF; DH=double helix PSF; CHIDO=coordinate and height super-resolution imaging with dithering and orientation. (i)=x-oriented single molecule (M); (ii) y-oriented SM; (iii)=z-oriented SM.

Other existing systems, such as coordinate and height super-resolution imaging with dithering and orientation (CHIDO) have poor depth of filed and are not robust with regard to aberration. FIG. 2 shows imaging results obtained using CHIDO. Both molecular orientation and axis position are encoded in the shapes of the PSFs. The images show theoretical (A) and experimental (B) aberration obtained using CHIDO.

Thus, there is still a need for an imaging system that overcomes these problems. The present application describes such a system.

SUMMARY

Described herein is an imaging system in which incoming light received from a source impinges on an MVR such that the MVR splits the incoming light into a multitude of light beams and reflects each beam of the multitude of beams into a separate direction. The reflected light beams are guided to one or more detection elements, thereby creating multiple images of the light source, which are used to determine the 3D position and 3D orientation of the source. The detection elements may be separate detection devices (e.g., CCD camera0, or they may be separate channels within a single device.

One aspect of this disclosure is an imaging system including a multi-view reflector (MVR) configured to split incoming light into at least two beams of light, and a detector comprising at least two detection elements, wherein the MVR reflects the at least two beams of light in different directions such that each of the at least two beams of light impinge on a separate detection element of the at least two detection elements. The imaging system may be part of a microscopic imaging system, and may comprise a polarizing beam splitter (PBS) positioned between the MVR and the detector, wherein the PBS is configured to provide x- and y-polarization separation to the MVR. The imaging system may comprise a vortex wave or half-wave plate configured to convert radially- and azimuthally-polarized light at the BFP to x- and y-polarized light, and configured, in cooperation with the PBS, to provide radial and azimuthal polarization separation to the MVR.

Another aspect of this disclosure is an imaging system including a detector including at least two detection elements, a multi-view reflector (MVR) including an air pyramid reflector and a glass pyramid reflector positioned between incoming light and the detector, a first lens, and a second lens. The air pyramid reflector includes an aperture face, a pyramidal face opposite the aperture face, and an aperture from the aperture face to the pyramidal face, the aperture face being oriented toward incoming light, and the glass pyramid reflector is positioned with an apex of the glass pyramid reflector pointing towards the aperture on the pyramidal face side of the air pyramid reflector to split incoming light into at least two beams of light and reflect the at least two beams of light to the pyramidal face of the air pyramid reflector for reflection by the air pyramid reflector to the detector. The first lens is positioned to receive incoming light and configured to direct the incoming light through the aperture of the air pyramid reflector to the glass pyramid reflector. The second lens is positioned to receive the at least two light beams reflected from the air pyramid reflector and configured to direct the at least two beams of light to the detector.

In another aspect, an imaging system includes a detector including at least two detection elements, a multi-view reflector (MVR) including a conical reflector and a glass pyramid reflector positioned between incoming light and the detector, a first lens, and a second lens. The conical reflector includes an exterior surface, an interior, reflective surface, and a vertex having an aperture from the exterior surface of the cone to the interior, reflective surface. The conical reflector is oriented so that incoming light enters the conical reflector through the aperture, and the glass pyramid reflector is positioned with an apex of the glass pyramid reflector pointing towards the aperture on the interior reflective surface side of the conical reflector to split incoming light into at least two beams of light and reflect the at least two beams of light to the interior, reflective surface of the conical reflector for reflection by the conical reflector to the detector. The first lens is positioned to receive incoming light and configured to direct the incoming light through the aperture of the conical reflector to the glass pyramid reflector. The second lens positioned to receive the at least two light beams reflected from the conical reflector and configured to direct the at least two beams of light to the detector.

Still another aspect of this disclosure is a method of measuring the 3-dimensional (3D) orientation and 3D position of a dipole, comprising obtaining an image of the dipole using an imaging system of the disclosure. The dipole may be a molecule comprising at least one light emitting source.

Another aspect of the disclosure is a method of imaging the 3D structure of a molecule or an organelle within a cell, comprising obtaining an image of the molecule or organelle using an imaging system of the disclosure.

Yet another aspect of the disclosure is method of tracking the movement of a molecule within a cell, comprising obtaining an image of the molecule using an imaging system of the disclosure.

Another aspect of this disclosure is method of imaging the interaction of two molecules within a cell, comprising obtaining an image of the two molecules using an imaging system of the disclosure.

Various refinements exist of the features noted in relation to the above-mentioned aspect. Further features may also be incorporated in the above-mentioned aspect as well. These refinements and additional features may exist individually or in any combination. For instance, various features discussed below in relation to any of the illustrated embodiments may be incorporated into the above-described aspect, alone or in any combination.

DESCRIPTION OF THE DRAWINGS

Those of skill in the art will understand that the drawings, described below, are for illustrative purposes only. The drawings are not intended to limit the scope of the present teachings in any way.

DETAILED DESCRIPTION OF THE INVENTION

Figure 1:
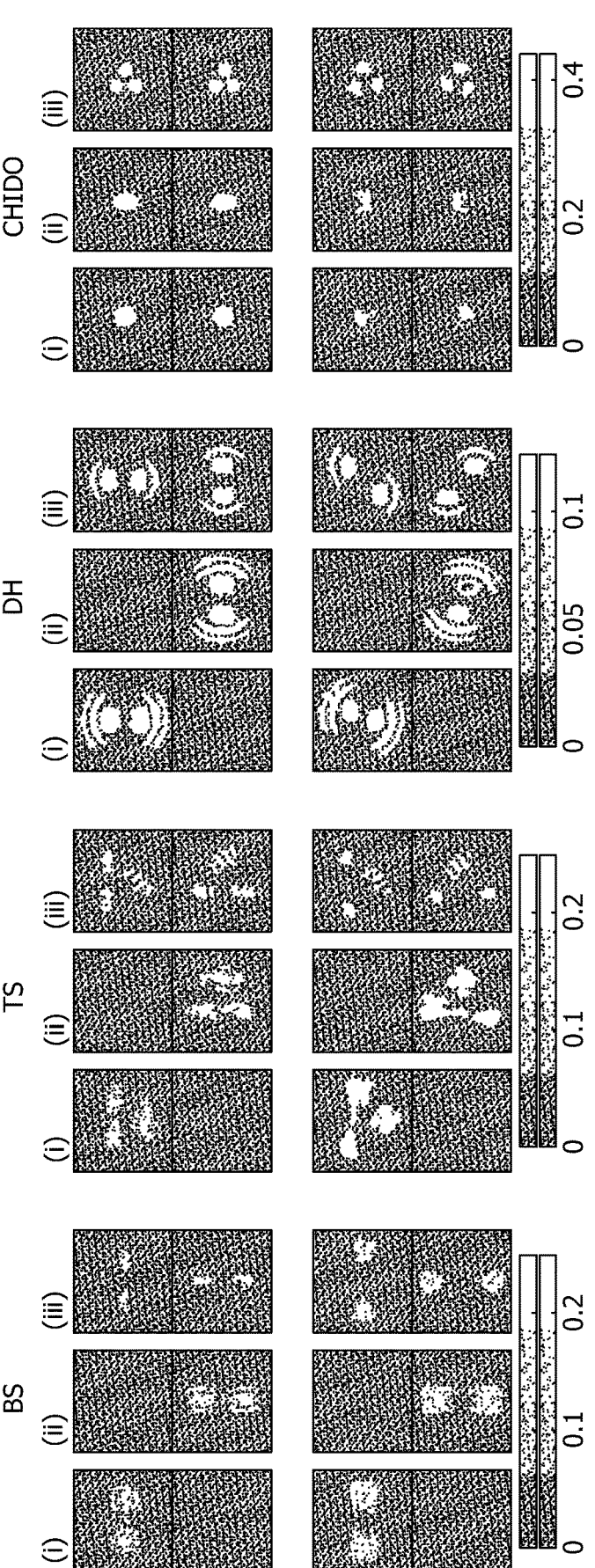
FIG. 1 shows imaging results obtained using current point spread function (PSF) engineering for single-molecule orientation localization microscopy (SMOLM).
Figure 2:
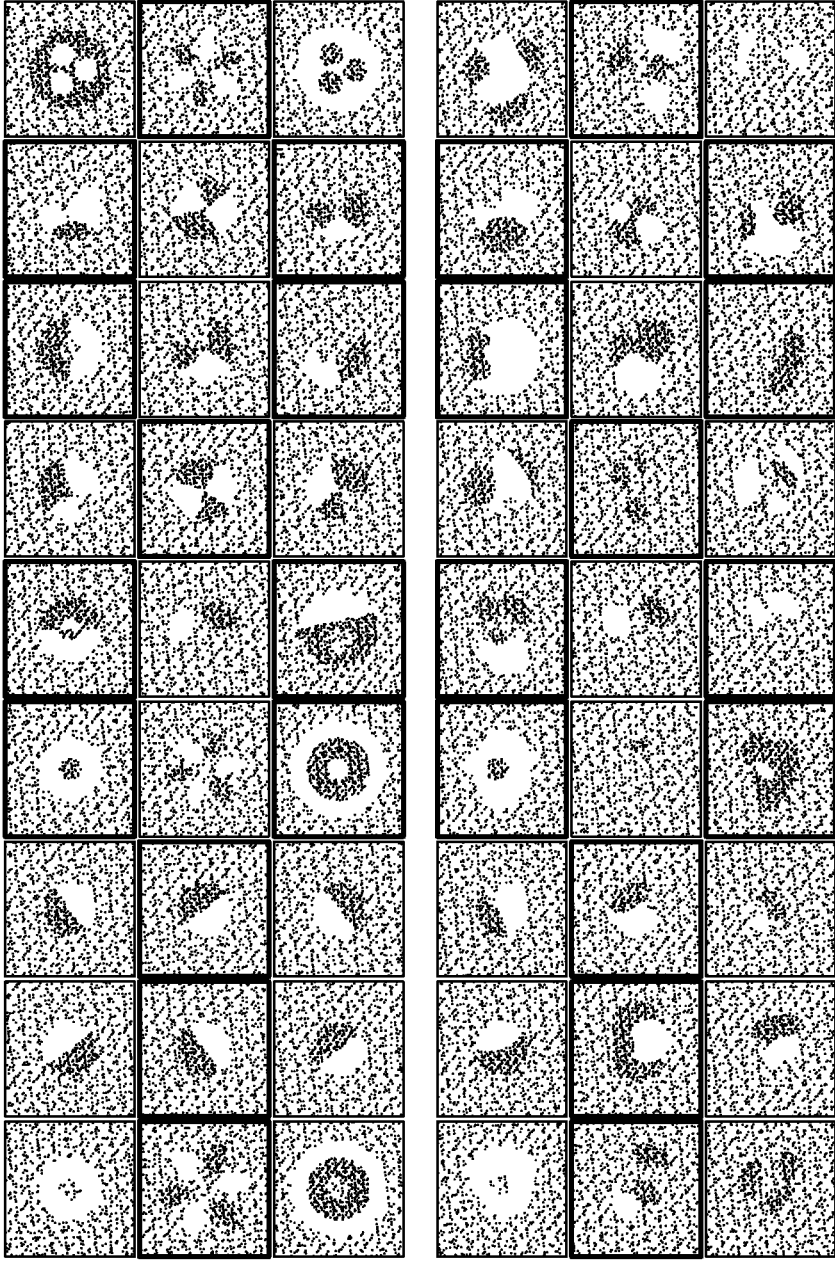
FIG. 2 shows imaging results obtained using CHIDO.

The present disclosure is based, at least in part, on the discovery of a multi-view reflector microscope that accurately images both the position and orientation of light emitters simultaneously. Existing microscopes are inherently limited in their ability to measure the position and orientation of molecules, and this information lies at the heart of understanding any biological or chemical target. The microscope disclosed herein enables all this information to be captured precisely and robustly.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

The present disclosure is generally directed to or towards imaging systems and methods, and particularly 3-dimensional (3D) systems and methods. More specifically, an imaging system and methods of use are disclosed for simultaneously measuring the 3D orientation and 3D position of dipole and dipole-like particles and molecules such as proteins within a cell. The disclosed systems achieve this using a multi-view reflector (MVR). Instead of using phase masks to apply phase ramps to light in different regions of the back focal plane (BFP), using an MVR allows the simultaneous and accurate measurement of 3D orientation and position. While in the MVR system the signal photons are separated into multiple spots, the background is also separated into N-detection channels, which maintains a favorable signal to background ratio. An MVR system also provides photon efficiency due to the usage of reflecting mirrors instead of transmission optical components. Such a system can also measure single molecules and bulk fluorescent samples.

Accordingly, an invention of the disclosure may generally be practiced by producing an imaging system in which incoming light received from a source impinges on an MVR such that the MVR splits the incoming light into a multitude of light beams and reflects each beam of the multitude of beams into a separate direction. The reflected light beams are guided to a detection device thereby creating multiple images of the light source, which are used to determine the 3D position and orientation of the source.

One embodiment of the disclosure is an imaging system comprising an MVR, the MVR being configured to split incoming light into at least two beams of light, and to reflect each of the at least two beams into different directions, such that each of the at least two different beams of light impinge on separate detection elements. As used herein, an imaging system refers to an optical system comprising optical elements, such as lenses, mirrors, photon detectors, and the like, that receives incoming light (i.e., photons), from a source, and directs at least a portion of the incoming light to at least one detection element, thereby producing an image from the incoming light. In certain aspects, the incoming light is split into a multitude of light beams that are directed to different detection element to produce a multitude of images, which are then used to measure the 3D position and orientation of the source. In certain aspects, the imaging system may be used to image a microscopic light source. Such an imaging system may be referred to as an MVR microscope. Thus, in one aspect, the imaging system is an MVR microscope.

Figure 3:
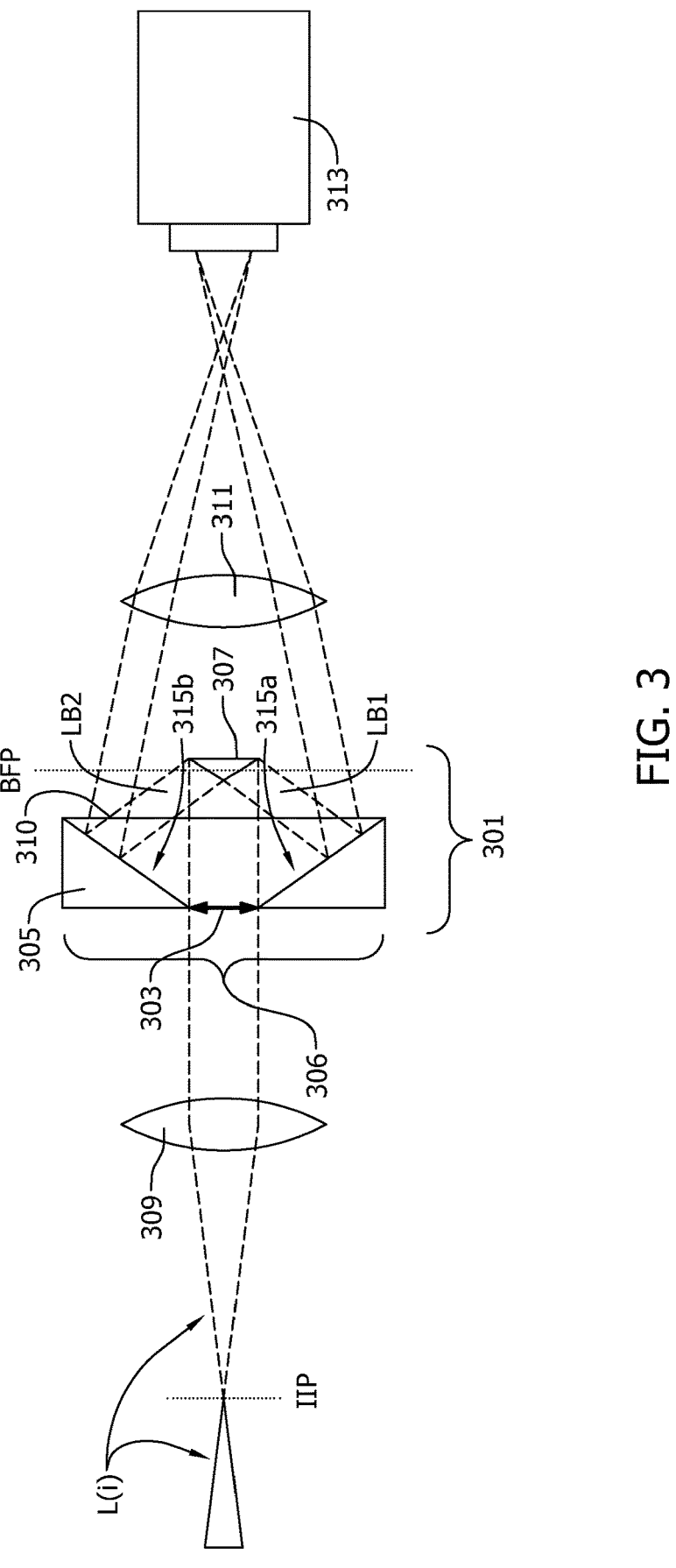
FIG. 3 is an illustration of the arrangements of optical elements in an exemplary MVR imaging system of the disclosure.
Figure 4:
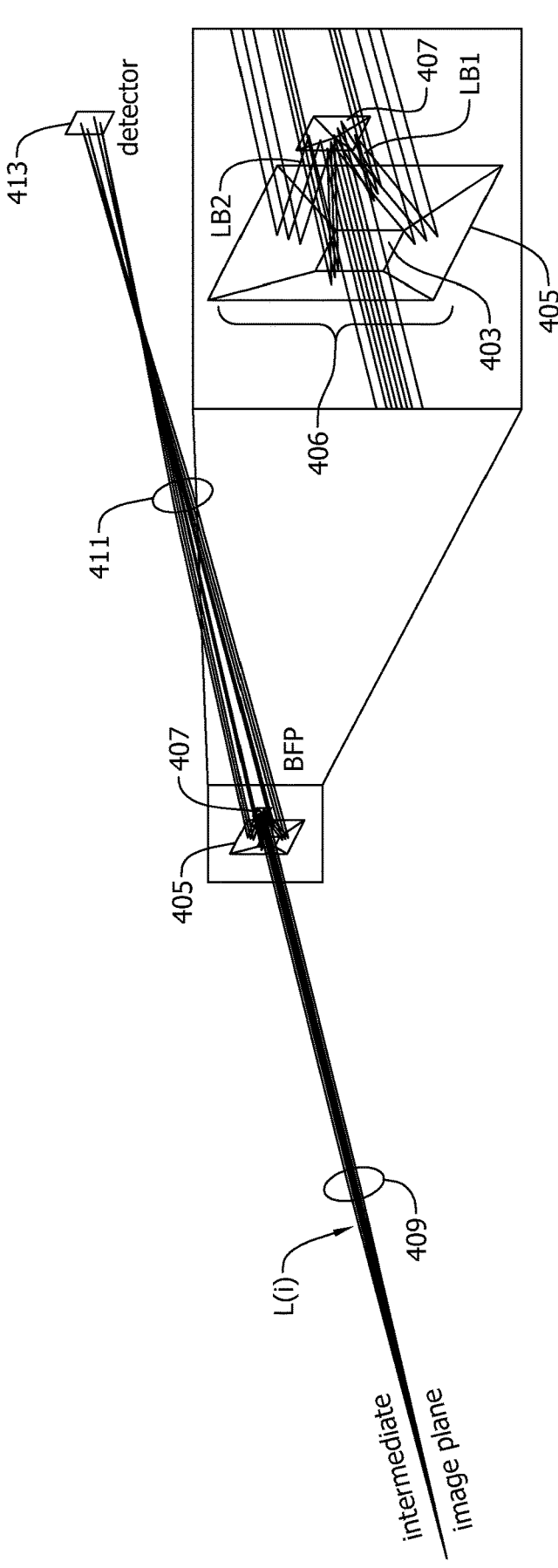
FIG. 4 shows another view of the arrangements of optical elements in an exemplary MVR imaging system of the disclosure, and an exploded view of an MVR.
Figure 5:
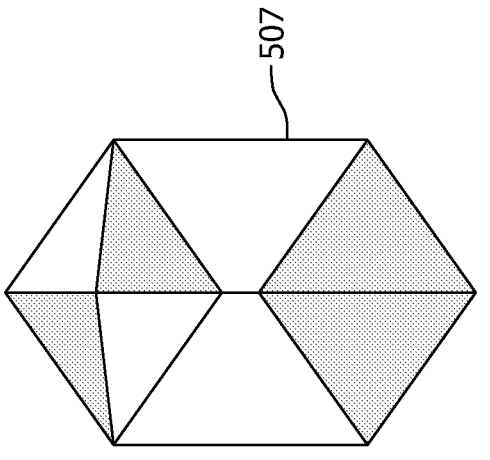
FIG. 5 illustrates an air pyramid and a glass pyramid used in an MVR of the disclosure.
Figure 5:
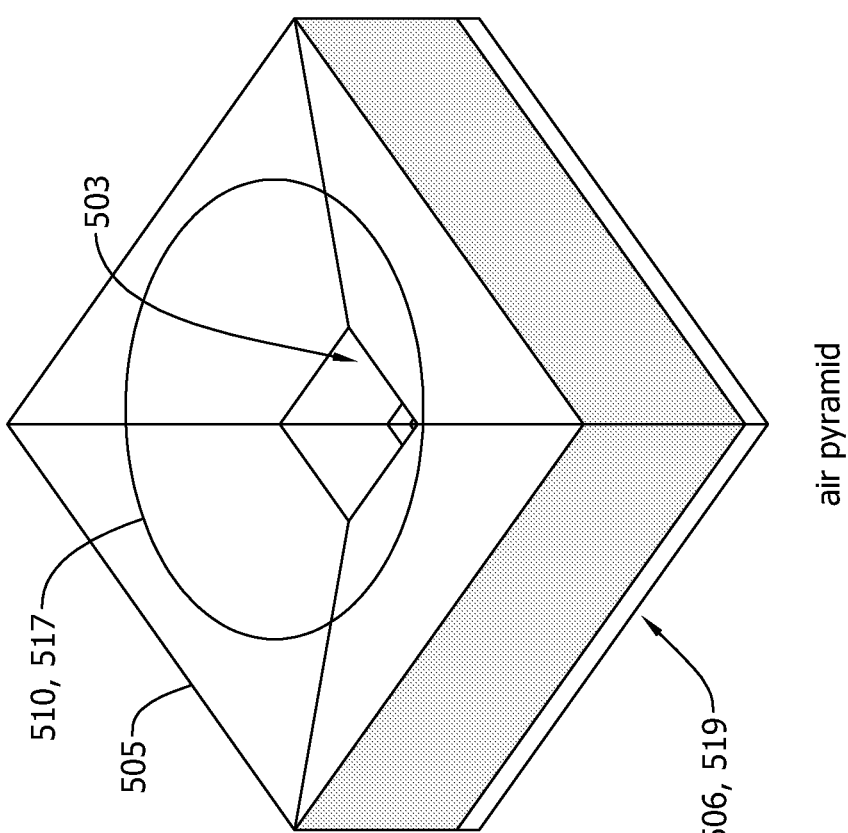

The MVR may comprise any type of optical elements, or combinations thereof, that split the incoming light into at least two beams of light and that redirect each of the at least two beams in a different direction from other beams of the at least two beams of light and to a detection element. As used herein, a reflector is an optical element that causes a change in the direction of light impinged thereon. In certain aspects, the MVR may comprise a knife reflector that splits and redirects the incoming light. In certain aspects, the MVR may comprise one or more conical reflectors. The shape of the conical reflector may be cylindrical, paraboloidal, ellipsoidal, hyperboloidal, or some other form having aspherical geometry. In certain aspects, the conical reflector may comprise an aperture (i.e., a hole) in the center of the reflector to allow for passage of light. One example of a conical reflector is a concave mirror. In certain aspects, the MVR may comprise one or more pyramid reflectors that split and/or redirect the incoming light. A pyramid reflector may be a pyramid-shaped mirror, which may be referred to as a glass pyramid reflector or a "glass pyramid". An example of a glass pyramid is illustrated in FIG. 5. It should be noted that use of the word "glass" in the name "glass pyramid" does not necessarily indicate that the mirror need be made from glass. The substrate from which the glass pyramid may be made includes other materials such as plastic, metal, ceramic, and the like, as long as the resulting pyramid, which may still be referred to as a glass pyramid, is capable of splitting and redirecting the incoming light. A pyramid reflector may be an air pyramid reflector ("air pyramid"). As used herein, an air pyramid refers to a rectangular prism, having top and bottom opposing faces, in which one face (e.g., the top face) has been hollowed out to form an inverted pyramid having angled walls and an apex angle, the apex of the inverted pyramid pointing to the opposing face (e.g., the bottom face), and comprising a transverse opening that connects the apex portion of the inverted pyramid with the opposing face (e.g., the bottom face). For ease of discussion, the hollowed-out face may be referred to as the pyramidal face, while the opposing face may be referred to as the aperture face. The transverse opening allows passage of light from one face of the air pyramid to the other and may be any shape necessary to allow the passage of light. For example, the transvers opening may be circular, rectangular, square, triangular, or octagonal in shape. Likewise, the diameter, or width, of the transverse opening can be as large as necessary to allow the passage of light. Examples of air pyramids are illustrated in FIGS. 3-5.

The apex angle of the inverted pyramid of the air pyramid determines the distance between the at least two light beams when they arrive at the detector element. Thus, the apex angle of the inverted pyramid may be any angle necessary to cause the at least wo light beams to impinge on a separate detection element (e.g., channels on the detector such as a CCD camera).

As used herein, a detection element refers to a component of the imaging system that senses photons (light) being impinged thereon. Any detector that senses photons may be used. Examples of suitable detection elements include, but are not limited to, charge coupled device (CCD) camera, a complementary metal-oxide-semiconductor (CMOS) camera, a photomultiplier tube, or an avalanche photodiode. One example of a detector useful for the disclosed imaging systems is an array detector, one example of which is a CCD camera. In one aspect, the detector may be a CCD camera, a CMOS camera, a photomultiplier tube, or an avalanche photodiode. Imaging systems of the disclosure may comprise multiple detectors. Similarly, a single detector may comprise multiple channels. Accordingly, the phrase "detector element" may refer to a single detection device or to a channel within a multi-channel detection device.

In certain aspects, the MVR may comprise multiple reflectors, lenses and/or mirrors. For example, in certain aspects, the MVR comprises an air pyramid and a second reflector. In these aspects, the second reflector may be oriented relative to the air pyramid so that light passing thought the transverse opening, in the aperture face-to-pyramidal face direction, strikes the second reflector and is reflected back to the pyramidal face of the air pyramid. In certain aspects, the second reflector splits the incoming light into at least two light beams and directs the at least two light beams in separate directions and to the pyramidal face of the air pyramid. In certain aspects, the second reflector may be a glass pyramid. In these aspects, the glass pyramid may be oriented relative to the air pyramid so that the apex of the glass pyramid points towards the pyramidal face of the air pyramid. In certain aspects, the apex of the glass pyramid may point to an axis that runs through the center of the transverse opening and perpendicular to the aperture face of the air pyramid.

In imaging systems of the disclosure, the air pyramid is configured so that light beams reflected from the walls of the inverted pyramid of the air pyramid are directed to a detection element. In certain aspects, the pyramidal face of the air pyramid faces the sensing surface of the detection element. Alternatively, light beams reflected from the walls of the inverted pyramid of the air pyramid are directed to a detection element by one or more optical elements, such as mirrors or lenses.

In certain aspects, the MVR may comprise a conical reflector and a second reflector, the conical reflector having an exterior surface, an interior, reflective surface, and an apex having an aperture therethrough connecting the exterior surface with the interior, reflective surface, so that light may pass therethrough. In these aspects, the second reflector may be oriented relative to the conical reflector so that light entering the conical reflector through the aperture (i.e., through the apex from the exterior to the interior), strikes the second reflector and is reflected back to the interior, reflective surface of the conical reflector. In certain aspects, the second reflector splits the incoming light into at least two light beams and directs the at least two light beams in separate directions and to the interior, reflective surface of the conical reflector. In certain aspects, the second reflector may be a glass pyramid. In these aspects, the glass pyramid may be oriented relative to the conical reflector so that the apex of the glass pyramid points towards the interior, reflective surface of the conical reflector. In certain aspects, the apex of the glass pyramid may point to an axis that runs through the center of aperture in the conical reflector.

In imaging systems of the disclosure, the conical reflector may be configured so that light beams reflected from the interior, reflective surface of the conical reflector are directed to a detection element. In certain aspects, the interior, reflective surface of the conical reflector faces the sensing surface of the detection element. Alternatively, light beams reflected from the interior, reflective surface of the conical reflector may be directed to a detection element by one or more optical elements, such as mirrors, lenses, and the like.

Imaging systems of the disclosure may also contain additional optical elements to direct the incoming light, and/or light beams reflected within or from the air pyramid, through and to optical elements of the system. In certain aspects, a first lens, such as a convex lens, may be positioned between the incoming light and the MVR. The first lens may serve to direct incoming light to the MVR and particularly, through the transverse opening of an air pyramid, or the aperture in a conical reflector, in the MVR. In these aspects, a second reflector (e.g., a glass pyramid) in the MVR may be positioned at the back focal plane (BFP) of the first lens. In certain aspects, the reflector (e.g., glass pyramid) may be slightly larger than the width of the BFP, the width of the BFP being parallel to the direction of travel of the incoming light.

In certain aspects, the imaging systems comprises an optical system, which may include or be a second lens such as a convex lens, a microscope, a camera, or a telescope, positioned between the source of the incoming light and the first lens. Such an optical system may capture incoming light and direct it towards the first lens. In these aspects, the first lens may be positioned between the MVR and the intermediate image plane (IIP) of a lens, such as the aforementioned second lens, in the optical system.

In certain aspects, imaging systems of the disclosure may comprise a third lens, such as a convex lens, between the MVR and the detection element. Such a lens may serve to narrow a light beam coming from the MVR so that it accurately impinges a single detector or channel in detection element.

In certain aspects, the detection element is configured to detect photons produced using a process including, but not limited to, luminescence, photoluminescence, fluorescence, phosphorescence, chemiluminescence, bioluminescence, and electrochemiluminescence.

In certain aspects, an imaging system of the disclosure may comprise additional optical elements to enhance the ability of the system to measure the 3D position and 3D orientation of the object being imaged. In certain aspects, the imaging system comprises an element that polarizes light within the imaging system. In certain aspects, the polarizing element is a waveplate, a half-waveplate, or a polarizing beam splitter.

To further describe and clarify the present disclosure, reference will now be made in detail to an exemplary embodiment, which is illustrated in the accompanying drawings. Wherever practicable, the same reference numbers will be used throughout the drawings to refer to the same or like parts.

FIG. 3 illustrates an exemplary imaging system of the disclosure. The MVR (301) is positioned between the intermediate image plane (IIP) of a first lens (not shown) that is positioned to receive incoming light (Li), and a detector (313). A second lens (309) is positioned between the IIP of the first lens and the MVR, the second lens (309) positioned to direct the incoming light to the MVR (301). The MVR (301) comprises an air pyramid (305), having an aperture face (306) that points towards the second lens (309) and a pyramid face (310) that faces away from the second lens (309). The relative spatial alignment of the second lens (309) and the air pyramid (305) is such that light coming from the second lens enters and passes through the transverse opening (303) of the air pyramid (305). The MVR also contains a glass pyramid (307) oriented so that the apex of the glass pyramid (307) points towards the pyramidal face (310) end of the transverse opening (303). Light from the second lens (309) passing through the transverse opening (303) strikes the glass pyramid (307) and is split into a multitude of light beams (LB1, LB2). The apex angle of the glass pyramid (307) is such that the multitude of light beams (LB1, LB2) are reflected to the walls (315*a*) and (315*b*) of the inverted pyramid in the air pyramid (305), which then reflect the light beams (LB1, LB2) to the detection element (313). A third lens (311) is positioned between the MVR (301) and the detection element 313), and is positioned such that the light beams reflected from the air pyramid (305) pass through the third lens (311) before striking the detection element (313). The apex angle of the air pyramid (305) and the properties of the third lens (e.g., focal length) are chosen so that the light beams reaching the detection element are spaced so that they impinge on separate detection elements (e.g., channels of a detector). It should be understood that while the optical elements in the imaging system depicted in FIG. 3 are arranged in a linear fashion, other arrangements are possible. For example, to produce a more compact imaging system, the various optical elements may be arranged in a circular or square configuration, the light beams being aimed at the various components using mirrors and/or lenses. Additionally, other configurations of elements are also possible. For example, in the MVR (301) illustrated in FIG. 3, the air pyramid reflector (305) may be replaced with a conical reflector having an exterior surface, an interior, reflective surface, and an apex having an aperture the through connecting the exterior surface with the interior, reflective surface, and oriented so that the interior, reflective surface of the conical reflector faces the apex of the glass pyramid (307). Light from the second lens (309) entering the conical reflector from the exterior by passing through the aperture strikes the glass pyramid (307) and is split into a multitude of beams (LB1, LB2) that are reflected to the interior, reflective surface of the conical reflector. The multitude of beams reflect off the interior, reflective surface of the conical reflector and are directed to the detection element (313). In certain aspects, a third lens (311) is positioned between the MVR (301) and the detection element 313), and is positioned such that the light beams reflected from the conical reflector pass through the third lens (311) before striking the detection element (313).

FIG. 4 shows a different view of the imaging system illustrated in FIG. 3, and an exploded and different angled view of the MVR. Similar reference numbers indicate elements similar to those in FIG. 3. Incoming light L(i) passes through a convex lens (409) that focuses the light into the transverse opening (403) of the air pyramid (405). The light passes toward the aperture face (406) and through the transverse opening (403), and strikes the glass pyramid (407), which splits the light into a multitude of light beams (LB1, LB2), directing them to the walls of the inverted pyramid of the air pyramid (405). The light beams reflect off the walls of the inverted pyramid of the air pyramid (405), which direct them to the detection element (413). Before reaching the detector, the light beams from the air pyramid pass through a third lens (411), which narrows the beams ensuring they strike separate detectors or separate areas (e.g., channels) of the detection element.

FIG. 5 provides a 3D illustration of an air pyramid (505) and a glass pyramid (507) that may be used as the air pyramid (305), (405) and the glass pyramid (307), (407) in the imaging systems shown in FIGS. 3 and 4. The air pyramid comprises a rectangular prism, having top (517) and bottom (519) opposing faces, in which one face (e.g., top face (517)) has been hollowed out to form an inverted pyramid having angled walls and an apex angle, the apex of the inverted pyramid pointing to the opposing face (e.g., bottom face (519)) and comprising a transverse opening (503) that connects the apex portion of the inverted pyramid with the opposing face (e.g., bottom face (519)). The hollowed-out face may be referred to as the pyramid face (510), while the opposing face may be referred to as the aperture face (506).

The concepts of the present disclosure are applicable to other scenarios and models as well. Associated features or elements as described throughout may be beneficial and/or advantageous in many respects, as the 3D orientation and location of individual molecules is an important marker for the local environment and the state of a molecule. For example, precise dipole localization is also significant for super-resolution imaging. Although not so limited, an appreciation of the various aspects of the present disclosure may be understood in light of the following description in connection with the drawings.

All publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

To evaluate the performance of a multi-view reflector (MVR) microscope system as disclosed herein, the following experiments were conducted.

The MVR can be combined with x- and y-polarization separation (xyMVR) by adding a polarizing beam splitter (PBS) to the detection path. We can also add a vortex half wave plate to the BFP to convert radially- and azimuthally-polarized light to x- and y-polarized light and use a PBS to achieve radial and azimuthal polarization separation (raMVR). Both variations may improve the system's orientational sensitivity. Similar to multi-spot PSFs, the axial position is encoded in the relative position, and orientation is encoded in the relative brightness of spots in each detection channel.

Figure 6:
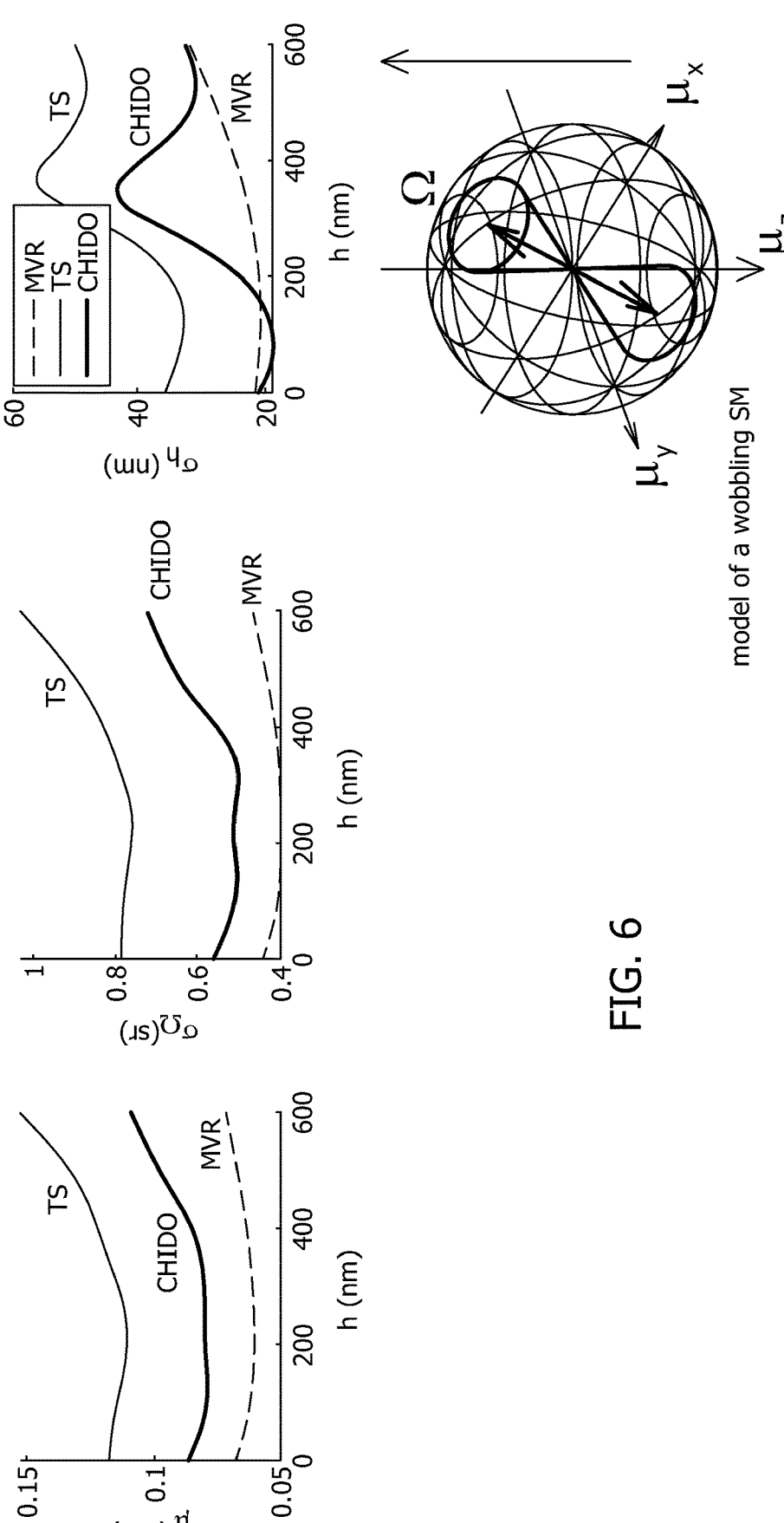
FIG. 6 shows compares the precision of measuring the orientation ($\mu$) (A), wobble angle ($\Omega$) (B) and axial position (h) (C) using raMVR (MVR), TS (state-of-the-art multiple-spot PSF) and CHIDO (state-of-the-art compact PSF) for molecules with 1000 signal photons and 5 background photons/pixel.

The precision for measuring the orientation ($\mu$), wobble angle ($\Omega$) and axial position (h) using raMVR, TS (a state-of-the-art multiple-spot PSF), and CHIDO (state-of-the-art compact PSF) for molecules with 1000 signal photons and 5 background photons/pixel were compared. The results are shown in FIG. 6. As can be seen, raMVR exhibited better and more uniform results.

Figure 7:
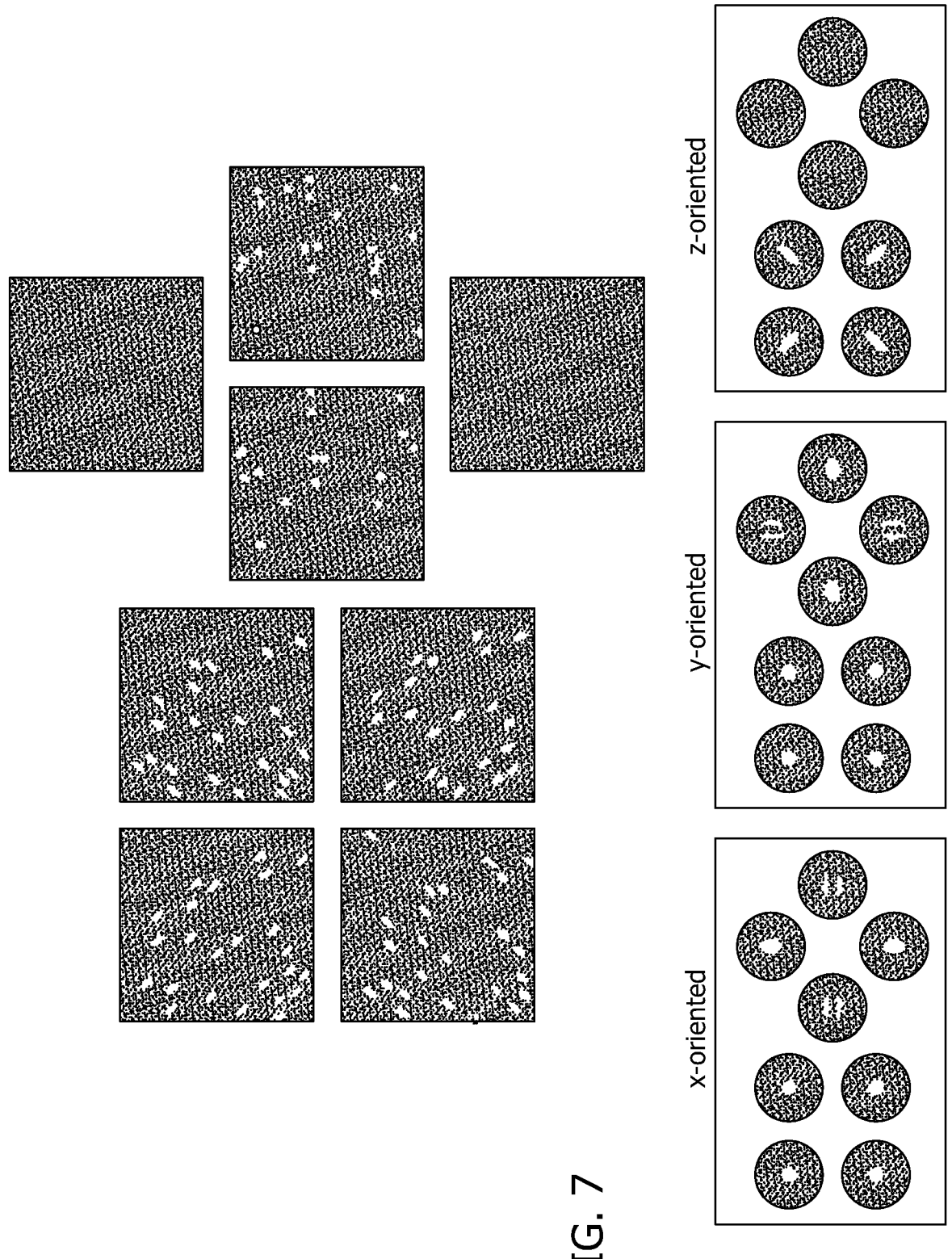
FIG. 7 shows a demonstration of raMVR using Nile Red within a lipid bilayer, where the lipid bilayer was illuminated with y-polarized light.

In another study, a lipid bilayer containing Nile Red was illuminated with y-polarized light and radial and azimuthal polarization separation MVR (raMVR) used to measure the orientation and position of the molecules. The results of this study are shown in FIG. 7. The results show that the majority of the molecules are parallel to the optical axis (z-oriented, doi: 10.1002/anie.202011444) and thus the photons are mainly in the left 4 channels. Since y-polarized illumination was used, molecules that are not z-oriented are mostly y-oriented (middle row of the right 4 channels).

Figure 8:
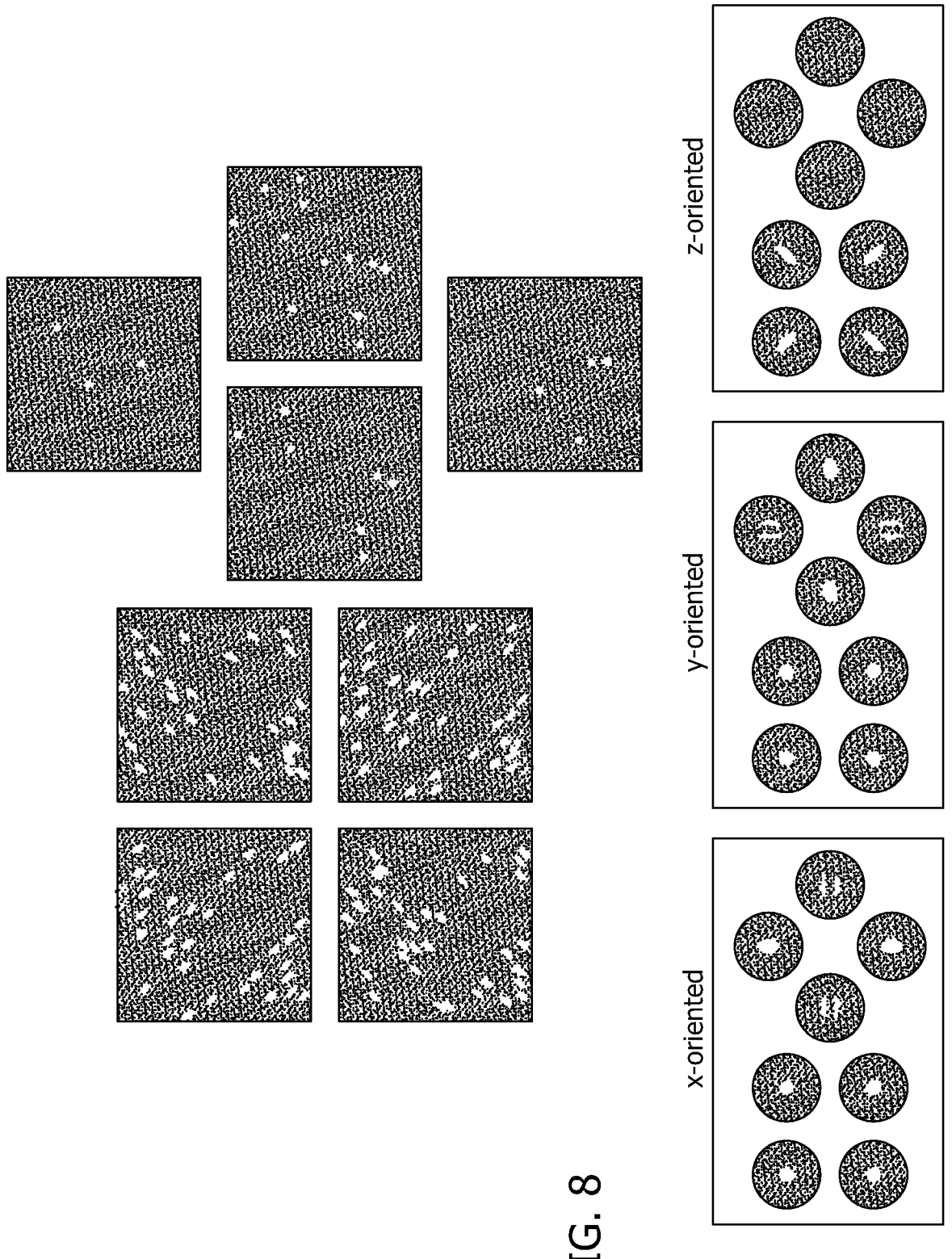
FIG. 8 shows a demonstration of raMVR using Nile Red within a lipid bilayer, where the lipid bilayer was bilayer illuminated with (xy) circularly-polarized light.

A lipid bilayer containing Nile Red was illuminated with (xy) circularly-polarized light and radial and azimuthal polarization separation MVR (raMVR) used to measure the orientation and position of the molecules. The results of this study are shown in FIG. 8. The results showed that the majority of the molecules were still z-oriented (left four channels). Molecules that were not z-oriented were either x- or y-oriented (four channels on right).

What is claimed is:

1. An imaging system comprising:
a multi-view reflector (MVR) configured to split incoming light into at least two beams of light; and
a detector comprising at least two detection elements, wherein the MVR reflects the at least two beams of light in different directions such that each of the at least two beams of light impinge on a separate detection element of the at least two detection elements, the MVR comprises a pyramid reflector and an air pyramid reflector including an aperture face oriented toward incoming light, and a pyramidal face opposite the aperture face, wherein an aperture is defined through the air pyramid reflector through which incoming light may pass.

2. The imaging system of claim 1, wherein the pyramid reflector is positioned relative to the air pyramid reflector so that incoming light passes through the aperture of the air pyramid reflector, strikes the pyramid reflector, and is split into at least two beams of light by the pyramid reflector, wherein each beam of light of the at least two beams of light is reflected from the pyramid reflector to the pyramidal face of the air pyramid reflector.

3. The imaging system of claim 2, wherein the pyramidal face of the air pyramid reflector is configured to reflect the at least two beams of light from the air pyramid reflector to the detection element.

4. The imaging system of claim 1, wherein the imaging system is part of a microscopic imaging system.

5. An imaging system comprising:
a multi-view reflector (MVR) configured to split incoming light into at least two beams of light; and
a detector comprising at least two detection elements, wherein the MVR reflects the at least two beams of light in different directions such that each of the at least two beams of light impinge on a separate detection element of the at least two detection elements, the MVR comprises a pyramid reflector and a conical reflector having an interior, reflective surface, and a vertex, an aperture being defined therethrough, the conical reflector oriented so that incoming light enters the conical reflector through the aperture in the vertex.

6. The imaging system of claim 5, wherein the pyramid reflector is positioned relative to the conical reflector so that incoming light passes through the aperture of the conical reflector, strikes the pyramid reflector, and is split into at least two beams of light by the pyramid reflector, wherein each beam of light of the at least two beams of light is reflected from the pyramid reflector to the interior, reflective surface of the conical reflector.

7. The imaging system of claim 6, wherein the interior, reflective surface of the conical reflector is configured to reflect the at least two beams of light from the conical reflector to the detection element.

8. The imaging system of claim 5, wherein the imaging system is part of a microscopic imaging system.

9. An imaging system comprising:
a multi-view reflector (MVR) configured to split incoming light into at least two beams of light;
a first lens positioned between the incoming light and the MVR to direct the incoming light into MVR; and
a detector comprising at least two detection elements, wherein the MVR reflects the at least two beams of light in different directions such that each of the at least two beams of light impinge on a separate detection element of the at least two detection elements, the MVR comprises a pyramid reflector, the pyramid reflector is a glass pyramid, and the glass pyramid is positioned at a back focal plane (BFP) of the first lens.

10. The imaging system of claim 9, comprising an optical system configured to collect light form a source of incoming light and direct it to the first lens.

11. The imaging system of claim 9, further comprising a polarizing beam splitter (PBS) positioned between the MVR and the detector, wherein the PBS is configured to provide x- and y-polarization separation to the MVR.

12. The imaging system of claim 11, further comprising a vortex wave or half-wave plate configured to convert radially—and azimuthally-polarized light at the BFP to x- and y-polarized light, and configured, in cooperation with the PBS, to provide radial and azimuthal polarization separation to the MVR.

13. The imaging system of claim 9, wherein the imaging system is part of a microscopic imaging system.

14. An imaging system comprising:
a multi-view reflector (MVR) configured to split incoming light into at least two beams of light; and
a detector comprising at least two detection elements, wherein the MVR reflects the at least two beams of light in different directions such that each of the at least two beams of light impinge on a separate detection element of the at least two detection elements, the at least two detection elements comprise a charge coupled device (CCD) camera, a complementary metal-oxide-semiconductor (CMOS) camera, a photomultiplier tube, or an avalanche photodiode, and the at least two detection elements are provided by a single detection element having two or more channels, and each of the two or more channels is a different one of the at least two detection elements.

15. The imaging system of claim 14, wherein the MVR comprises a knife reflector.

16. The imaging system of claim 14, wherein the imaging system is part of a microscopic imaging system.

17. An imaging system comprising:

a detector including at least two detection elements;

a multi-view reflector (MVR) including an air pyramid reflector and a glass pyramid reflector positioned between incoming light and the detector, the air pyramid reflector including an aperture face, a pyramidal face opposite the aperture face, and an aperture from the aperture face to the pyramidal face, the aperture face being oriented toward incoming light, and the glass pyramid reflector is positioned with an apex of the glass pyramid reflector pointing towards the aperture on the pyramidal face side of the air pyramid reflector to split incoming light into at least two beams of light and reflect the at least two beams of light to the pyramidal face of the air pyramid reflector for reflection by the air pyramid reflector to the detector;

a first lens positioned to receive incoming light and configured to direct the incoming light through the aperture of the air pyramid reflector to the glass pyramid reflector; and a second lens positioned to receive the at least two light beams reflected from the air pyramid reflector and configured to direct the at least two beams of light to the detector.

18. The imaging system of claim 17, wherein the imaging system is part of a microscopic imaging system.

19. An imaging system comprising:

a detector including at least two detection elements;

a multi-view reflector (MVR) including a conical reflector and a glass pyramid reflector positioned between incoming light and the detector;

the conical reflector including an exterior surface, an interior, reflective surface, and a vertex having an aperture from the exterior surface of the cone to the interior, reflective surface;

the conical reflector being oriented so that incoming light enters the conical reflector through the aperture, and the glass pyramid reflector is positioned with an apex of the glass pyramid reflector pointing towards the aperture on the interior reflective surface side of the conical reflector to split incoming light into at least two beams of light and reflect the at least two beams of light to the interior, reflective surface of the conical reflector for reflection by the conical reflector to the detector;

a first lens positioned to receive incoming light and configured to direct the incoming light through the aperture of the conical reflector to the glass pyramid reflector; and a second lens positioned to receive the at least two light beams reflected from the conical reflector and configured to direct the at least two beams of light to the detector.

20. The imaging system of claim 19, wherein the imaging system is part of a microscopic imaging system.

\*    \*    \*    \*    \*